Oct. 11, 1938.  M. P. YOUKER  2,132,453
HYDROCARBON FLUID CONVERSION PROCESS
Filed May 12, 1932
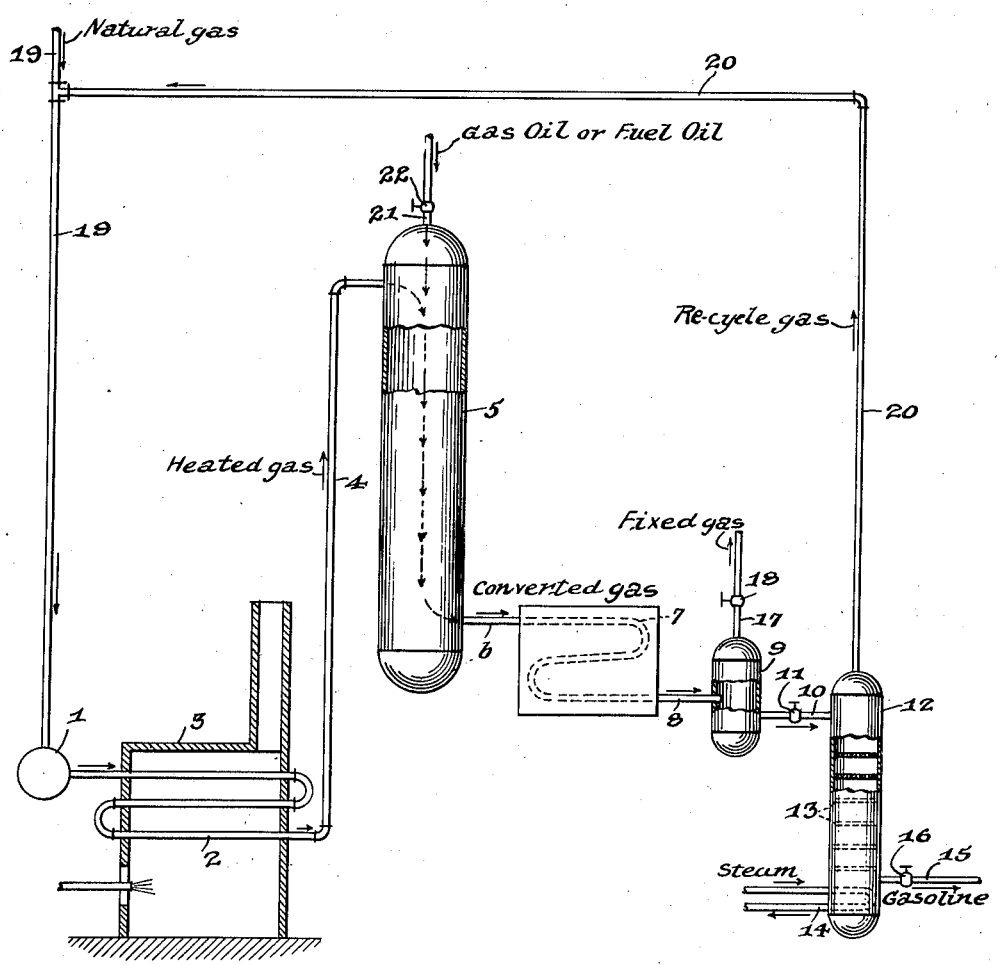
Inventor
Malcolm P. Youker
by Robt. E. Barry
Attorney Patented Oct. 11, 1938

2,132,453

UNITED STATES PATENT OFFICE 2,132,453

HYDROCARBON FLUID CONVERSION PROCESS

Malcolm P. Youker, Bartlesville, Okla., assignor to Phillips Petroleum Company, Bartlesville, Okla., a corporation of Delaware Application May 12, 1932, Serial No. 610,907

11 Claims. (Cl. 196—9)

My invention relates to the conversion of highly volatile hydrocarbon constituents of natural gas into comparatively less volatile hydrocarbon liquids. An object of my invention is to change the molecular arrangement of carbon and hydrogen in some of the constituents of natural gas to produce gasoline. By my new process, this and other desirable advantages are obtained.

The present invention was disclosed in my application Serial No. 27,234, filed May 1, 1925, which has matured into Letters Patent No. 1,800,586.

My invention will be more fully understood from the following description, taken in conjunction with the accompanying drawing, in which:

The figure illustrates diagrammatically in side elevation, one form of apparatus by which my new process may be carried out.

Referring to the drawing, the numeral 1 designates a pump which operates to pump either liquid or gas, or a mixture of both through a heating coil 2, which is mounted in a furnace 3. A pipe 4, leads from the outlet of heating coil 2, into the top of a vertical cylindrical closed vessel 5. A pipe 6 leads from the bottom of the vessel 5, into a condensing worm 7. A pipe 8, leads from the outlet of condenser worm 7 into a closed cylindrical vessel 9. A pipe 10 in which is mounted a valve 11, leads from the bottom of vessel 9, into the top of a fractionating column 12. Perforated bubbling plates 13 are disposed in fractionating column 12. A heating coil 14, which is in communication with a supply of steam is disposed in the bottom of fractionating column 12. A pipe 15 in which is mounted a valve 16, leads from the bottom of fractionating column 12, to storage tanks which are not shown. A vent pipe 17, in which is mounted a valve 18, leads from the top of vessel 9. A pipe 19 which is in communication with a supply of natural gas, leads to the intake of pump 1. A pipe 20 leads from the top of fractionating column 12 into pipe 19. A pipe 21 in which is mounted a valve 22, and which is in communication with a supply of heated fuel oil or gas oil, or the like, held under a pressure in excess of the pressure maintained in the vessel 5, leads into the top of vessel 5.

The apparatus shown in the drawing will be operated to carry out my new process as follows:

Natural gas, in either liquefied or gaseous state, will be continuously delivered through pipe 19 to the pump 1, and will be forced by pump 1, through the heating coil 2, the pipe 4, the vessel 5, the pipe 6, the condensing worm 7, and the pipe 8, into the vessel 9. This gas, in passing through the heating coil 2, will be heated to a temperature above 500° F., and preferably above 750° F. The rate at which gas will be pumped through the heating coil and the closed vessel 5 into the condenser worm 7, will be such that after this gas has been heated in the heating coil 2, such gas will remain in such heated condition in the vessel 5 for an appreciable period of time, preferably in excess of two minutes, before flowing into the condenser worm 7. A part of the gas which will pass from the vessel 5, through the pipe 6 and condenser worm 7, will be condensed in the condenser worm 7, and the resulting liquid and gas will flow thence through the pipe 8, into the vessel 9. Gas which will collect in the vessel 9 will be continuously withdrawn through the pipe 17, and the valve 18, while liquid which will gather in the vessel 9 will be continuously delivered thence through the pipe 10 and the valve 11, into the top of the fractionating column 12. A part of the liquid which will flow into the top of the fractionating column will flow down over bubble plates 13 and will collect in the bottom of fractionating column 12. Steam will be passed through the heating coil 14, which will heat and vaporize a part of the liquid which will gather in the bottom of the fractionating column 12, and vapors thus produced will rise through the fractionating column and will pass thence through the pipe 20, into the pipe 19 where such vapors will mingle with the natural gas which will flow through the pipe 19 to the pump 1, to be processed. Gasoline will be withdrawn from the bottom of the rectifying column through the pipe 15, and the valve 16. The volatility of the gasoline thus obtained will be regulated by regulating the quantity of heat supplied to the liquid in the bottom of the fractionating column by means of the heating coil 14. Raising the temperature of the liquid which will gather in the bottom of the fractionating column will decrease the volatility of the gasoline obtained and vice versa. The whole system, including the supply of natural gas which is to be processed, may be held under substantially the same pressure, save for frictional losses; however, I will preferably maintain that part of the system which is inter-communicating between the pump 1, and the valve 11, under a pressure in excess of 500 pounds per square inch, and in excess of the pressure maintained in the remainder of the system.

The molecular structure of the highly volatile natural gas which will be heated in heating coil 2, and which will remain in such heated condition and under high pressure for an appreciable period of time in the vessel 5, will be changed in such a way that comparatively less volatile hydrocarbons will be formed from the hydrogen and carbon present in the natural gas, while at the same time, hydrogen will be liberated from the natural gas and hydrocarbon gases, which are more volatile than was the original natural gas, will also be formed. After this molecular rearrangement of the elemental constituents of the natural gas has taken place in the vessel 5, the resulting liquid and gases will be passed through the remainder of the process, as has been described, for the purpose of recovering the desirable products which will have been thus produced. On account of the fact that the quantity of carbon present in the natural gas is not sufficient for the production of a maximum quantity of gasoline from the natural gas, hydrocarbon liquid such as gas oil or fuel oil, which is rich in carbon, may be mixed with the natural gas which is being processed with beneficial results. I may introduce gas oil or fuel oil into the gas which is being processed through the valve 22 and the pipe 21. However, the addition of such hydrocarbon liquid which is rich in carbon, is not necessary to the process, and I may elect to process natural gas by my new process without the addition of any material which is extraneously supplied. I may also elect to add a hydrocarbon liquid which is comparatively rich in carbon to the natural gas which is to be processed before such gas is passed through the heating coil 2.

It will be noted that there is no definite single set of operating conditions which is critical for successfully practicing the invention. The temperature, pressure and time factors will vary, depending on the particular kind of hydrocarbon gas processed and the specific kind of oil introduced through the pipe 21 or into the inlet of coil 2. In practicing the invention, the temperatures will range from 750° F. to 1100° F. The pressures will range from 500 pounds per square inch to 4000 pounds per square inch, and the material will remain in the vessel 5 for a period preferably in excess of two minutes, but not more than about ten minutes.

While I have described in considerable detail one method of carrying out my new process, it is to be understood that I do not intend that I shall be limited by these details, but intend to claim all novelty which is inherent in my invention. While it is my intention to apply my new process principally to the purpose of manufacturing gasoline from natural gas, I may use the process to manufacture other hydrocarbon liquids and I may also process other hydrocarbon gases. In some cases I will manufacture a heavy hydrocarbon liquid similar to crude petroleum.

From the foregoing it is believed that the construction, operation and advantages of my invention may be readily understood by those skilled in the art, and I am aware that changes may be made in the details disclosed, without departing from the spirit of the invention, as expressed in the claims.

What I claim and desire to secure by Letters Patent is:

1. The process for converting hydrocarbon fluids, comprising placing a hydrocarbon gas under a pressure in excess of 500 pounds per square inch, continuously feeding the compressed gas through an elongated passageway of restricted cross sectional area arranged in a heating zone and maintained at a temperature above 500° F., discharging the heated gas into an enlarged reaction zone and maintaining the gas therein in said heated and compressed state for a time sufficient to convert a portion of the gas into liquid hydrocarbons, adding hot hydrocarbon oil to the gas in the reaction zone while the gas is undergoing conversion in said heated and compressed state, separating from the resulting mixture, fixed gas, gasoline, and hydrocarbon vapors heavier than said fixed gas and lighter than said gasoline, releasing the fixed gas substantially constantly from the process, withdrawing gasoline from the process, and returning the hydrocarbon vapors for reprocessing in the same cycle.

2. In a process of the character described, heating a flowing stream of hydrocarbon gas in an elongated passageway of restricted cross sectional area, to a temperature in excess of 500° F. while the gas is under a pressure in excess of 500 pounds per square inch, then introducing the gas into an enlarged reaction chamber, mixing hot hydrocarbon oil with the heated gas in said chamber and maintaining the mixture in said chamber at said temperature and pressure for a time sufficient to convert a portion of the gas into liquid hydrocarbons, separating from the resulting mixture fixed gas, gasoline and hydrocarbon vapors heavier than said fixed gas and lighter than said gasoline, releasing the fixed gas substantially constantly from the process, withdrawing gasoline from the process, and returning the hydrocarbon vapors for reprocessing in the same cycle.

3. In a process of the character described, subjecting a stream of hydrocarbon gas to a temperature in excess of 500° F. while holding the gas under a pressure in excess of 500 pounds per square inch, then introducing the gas stream into an enlarged reaction chamber, feeding a stream of hydrocarbon oil into the top of said chamber and commingling the gas and oil in said chamber while maintaining the mixture in the chamber at said temperature and pressure for a time sufficient to convert a portion of the gas into liquid hydrocarbons, discharging the mixture from the chamber and cooling the same, separating fixed gas from the resulting mixture and discharging the same from the system, and also separating gasoline from said mixture.

4. In a process of the character described, subjecting a stream of hydrocarbon gas to a temperature in excess of 500° F. while holding the gas under a pressure in excess of 500 pounds per square inch, then introducing the gas stream into an enlarged reaction chamber, feeding a stream of hydrocarbon oil into the top of said chamber and commingling the gas and oil in said chamber while maintaining the mixture in the chamber at said temperature and pressure for a time sufficient to convert a portion of the gas into liquid hydrocarbons, discharging the mixture from the chamber and cooling the same, separating fixed gas from the resulting mixture, discharging the same from the system and also separating gasoline from said mixture, and returning hydrocarbon vapors heavier than said fixed gas and lighter than said gasoline from the mixture for reprocessing in the same cycle.

5. In a process of the character described, heating a stream of hydrocarbon gas to a temperature of at least 500° F. while maintaining the same at a pressure in excess of 500 pounds per square inch, then introducing the stream into an enlarged reaction chamber, introducing a stream of hot hydrocarbon oil into said chamber and commingling the streams in the chamber, maintaining the mixture in said chamber for a time sufficient to convert the same, then discharging the mixture from the chamber, and separating from the same fixed gas, hydrocarbon vapors and gasoline, said hydrocarbon vapors being heavier than said fixed gas and lighter than said gasoline.

6. A process of the character described, comprising feeding a stream of normally gaseous hydrocarbons through a heating zone, subjecting the stream in the heating zone to sufficient heat and pressure to convert some of the normally gaseous hydrocarbons into liquid hydrocarbons, discharging the heated and compressed gas into an enlarged reaction zone, mixing with the stream after it leaves the heating zone and while it is in highly heated condition in the reaction zone, a hot heavier hydrocarbon liquid, feeding the resulting stream into a separating chamber, discharging a liquid portion of the stream from the separating chamber, reducing the pressure on said portion and rectifying the same under reduced pressure and thereby separating hydrocarbons lighter than gasoline from said portion, and feeding some of the last mentioned hydrocarbons under superatmospheric pressure into the stream entering the heating zone.

7. A process for the conversion of normally gaseous hydrocarbons to normally liquid hydrocarbons, which consists in flowing a stream of said gaseous hydrocarbons through a restricted passageway and heating said gaseous material therein to a temperature above 750° F. and sufficiently high to cause the reformation of a portion of said gaseous hydrocarbons into normally liquid hydrocarbons, passing said heated gaseous material through an enlarged reaction zone, in which said heated material is retained for a sufficient length of time to permit the reformation of some of said normally gaseous hydrocarbons into normally liquid hydrocarbons and adding a stream of hydrocarbon liquid to said stream of gaseous hydrocarbons after said stream of gaseous hydrocarbons has been subjected to the heating step and prior to the exit of said stream of gaseous material from said reaction zone, all of said operations being carried out under pressure in excess of 500 pounds per square inch.

8. A process for the conversion of normally gaseous hydrocarbons to normally liquid hydrocarbons, which consists in flowing a stream of said gaseous hydrocarbons through a restricted passageway and heating said gaseous material therein to a temperature above 750° F. and sufficiently high to cause the reformation of a portion of said gaseous hydrocarbons into normally liquid hydrocarbons, passing said heated gaseous material through an enlarged reaction zone, in which said heated material is retained for a sufficient length of time to permit the reformation of some of said normally gaseous hydrocarbons into normally liquid hydrocarbons and adding a stream of petroleum distillate to said stream of gaseous hydrocarbons after said stream of gaseous hydrocarbons has been subjected to the heating step and prior to the exit of said stream of gaseous material from said reaction zone, all of said operations being carried out under pressure in excess of 500 pounds per square inch.

9. A process for the conversion of normally gaseous hydrocarbons to normally liquid hydrocarbons, which consists in flowing a stream of said gaseous hydrocarbons through a restricted passageway and heating said gaseous material therein to a temperature above 750° F. and sufficiently high to cause the reformation of a portion of said gaseous hydrocarbons into normally liquid hydrocarbons, passing said heated gaseous material through an enlarged reaction zone, in which said heated material is retained for a sufficient length of time to permit the reformation of some of said normally gaseous hydrocarbons into normally liquid hydrocarbons and adding a stream of hydrocarbon liquid to said stream of gaseous hydrocarbons after said stream of gaseous hydrocarbons has been subjected to the heating step and prior to the exit of said stream of gaseous material from said reaction zone, all of said operations being carried out under pressure in excess of 500 pounds per square inch, said stream of normally gaseous hydrocarbons being initially in the liquid state.

10. A process for the conversion of normally gaseous hydrocarbons to normally liquid hydrocarbons, which consists in flowing a stream of said gaseous hydrocarbons through a restricted passageway and heating said gaseous material therein to a temperature above 750° F. and sufficiently high to cause the reformation of a portion of said gaseous hydrocarbons into normally liquid hydrocarbons, passing said heated gaseous material through an enlarged reaction zone, in which said heated material is retained for a sufficient length of time to permit the reformation of some of said normally gaseous hydrocarbons into normally liquid hydrocarbons and adding a stream of hydrocarbon liquid to said stream of gaseous hydrocarbons after said stream of gaseous hydrocarbons has been subjected to the heating step and prior to the exit of said stream of gaseous material from said reaction zone, all of said operations being carried out under pressure in excess of 500 pounds per square inch, separating the products produced by passage of said materials through said reaction zone into a gaseous fraction, a liquid fraction, and a third fraction, said third fraction being composed of normally gaseous hydrocarbons, and reprocessing said third fraction.

11. A process for the conversion of normally gaseous hydrocarbons to normally liquid hydrocarbons, comprising flowing a stream of said gaseous hydrocarbons through a restricted passageway and heating said gaseous material theresageway and heating said gaseous material therein to a temperature above 750° F. and sufficiently high to cause the reformation of a portion of said gaseous hydrocarbons into normally liquid hydrocarbons, passing said heated gaseous material through an enlarged reaction zone, in which said heated material is retained for a sufficient length of time to cause the reformation of some of said normally gaseous hydrocarbons into normally liquid hydrocarbons, adding normally liquid hydrocarbons to said stream in the reaction zone to cause reaction between the hydrocarbons of the stream and the added liquid hydrocarbons, said heating and reaction being conducted under pressure in excess of 500 pounds per square inch, and separating gasoline from the resulting mixture.

MALCOLM P. YOUKER.